June 19, 1973     H. L. STROTERHOFF     3,740,196
CHEMICAL SPOT TEST SYSTEM
Filed March 30, 1971

INVENTOR
Howard L. Stroterhoff
Harry M. Saragovitz
Edward J. Kelly
Herbert Berl
BY Bernard J. Ohlendorf
ATTORNEYS

United States Patent Office 3,740,196
Patented June 19, 1973

3,740,196
CHEMICAL SPOT TEST SYSTEM
Howard L. Stroterhoff, Baltimore, Md., assignor to the United States of America as represented by the Secretary of the Army
Filed Mar. 30, 1971, Ser. No. 129,360
Int. Cl. B65d 79/00; G01n 31/22
U.S. Cl. 23—253 TP                                      6 Claims

ABSTRACT OF THE DISCLOSURE

An apparatus, material, and method of producing the material for an improved chemical spot test system; the invention being an aluminized paper in the apparatus to react exothermically with a $CuCl_2$ solution to generate heat to sensitize a mustard agent spot test.

DEDICATORY CLAUSE

The invention described herein may be manufactured, used, and licensed by or for the Government for governmental purposes without the payment to me of any royalty thereon.

My invention relates to a new apparatus, material, and method of producing the material for chemical spot test systems containing multiple spot tests enclosed in a container which can be carried in a jacket or shirt pocket; my invention being an improvement of apparatus such as disclosed and claimed in U.S. patent application Ser. No. 52,499 filed July 6, 1970.

The spot tests in the aforementioned systems are designed to detect chemical species down to 0.02 part per million in water and air and are contained in packaging and support means made of weldable and impermeable plastic film.

The prior art apparatus, such as the exemplary apparatus described in the aforementioned patent application, employed a mustard agent spot test means wherein $CuCl_2$ solution contacted aluminum discs, such as discs 12 in the aforementioned patent application, to generate sufficient heat to achieve adequate sensitivity for the mustard agent spot test. The use of the aforementioned aluminum discs presented a problem of assembly in that the discs were thin and had a small size, about ¼ inch in diameter, which made handling of the discs difficult. Moreover, the aluminum discs were difficult to wet with the $CuCl_2$ solution which caused a delay in heat generation and adversely affected the sensitivity of the mustard agent spot test. Further, excess $CuCl_2$ in the prior art device would often leak from the apparatus. My invention was conceived and reduced to practice to overcome the aforementioned aluminum disc problem and to satisfy the long felt need for a heat generating means for a mustard agent spot test in a chemical spot test system.

My invention has utility in any chemical system wherein an aluminum and $CuCl_2$ exothermic reaction is required.

A principal object of my invention is to provide a reliable, effective, and sensitive means and material for detecting the presence of mustard agent by a chemical spot test system.

A further object of my invention is to provide an easily assembled means and material to detect mustard agent which employs a $CuCl_2$ and aluminum exothermic reaction wherein excess $CuCl_2$ will not leak from the assembled means.

Another object of my invention is to provide an inexpensive and easy method for manufacturing an aluminum means for use in a means to detect mustard agent.

Other objects of my invention will be obvious or will appear from the specification hereinafter set forth.

My invention, as shown in FIGS. 1 to 5, will now be described in detail as follows.

Figure 4:
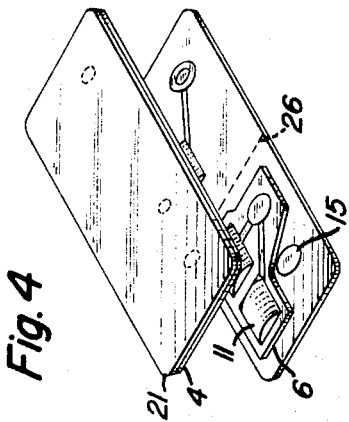
FIG. 4 is an exploded view showing the structures shown in FIG. 1, after lamination, located above the structures shown in FIG. 3 preparatory to lamination of the entire system.
Figure 3:
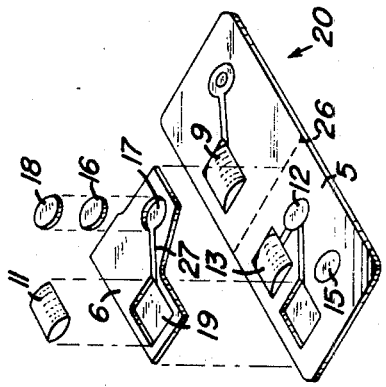
FIG. 3 is an exploded view showing the structure shown in FIG. 2 after assembly of the components therein with a module means, made of plastic film, above the FIG. 2 structure and also showing components to be assembled within the module means.
Figure 1:
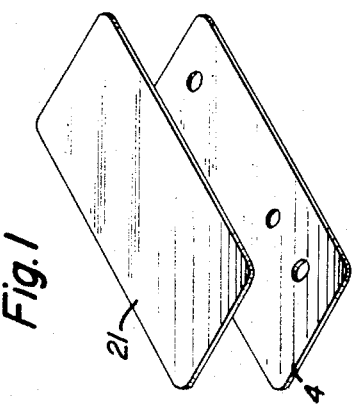
FIG. 1 is a view showing an aluminum protective shield and a cover, made of plastic film, for the plastic film container means shown in FIG. 2; the view being prior to lamination.
Figure 2:
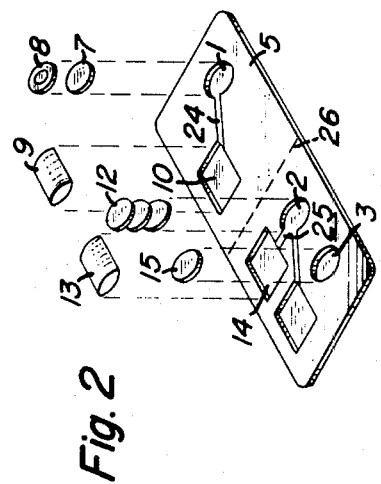
FIG. 2 is an exploded view showing a container means made of plastic film and components to be assembled within the container means.
Figure 5:
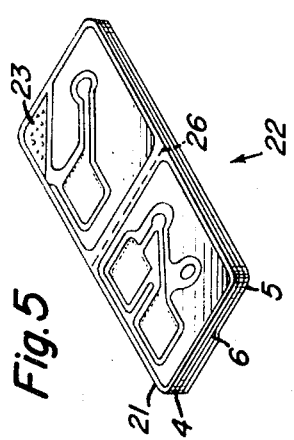
FIG. 5 is a view showing the entire assembly of structures shown in FIGS. 1 to 4 after lamination.

The plastic film to produce cover 4, package 11, and module 6, shown in FIGS. 1 and 3, was produced by subjecting a commercially available chlorofluorocarbon film of the general formula $(CF_2-CFCl)_x$ to a vacuum of approximately 1 millimeter of mercury at 195° F. until the volatile content of the film was reduced to no greater than 0.05 part per million when measured at 150° F. under a vacuum of approximately 1 inch of mercury; the measurement at 150° F. being made in the conventional manner. The resulting vacuum treated film remained pliable, weldable, and impermeable. While any part configuration for any desired chemical system application can be stamped from the above described plastic film by conventional machine shop stamping technique, exemplary configurations are demonstrated by aforementioned structures 4, 11, and 6. Also, while the above described plastic film is suitable for any applicable chemical system, an exemplary system for detection of nerve agent presence in air or water is provided by inserting sintered glass disc 7 in recess 1 and superimposing an enzyme spot disc 8 on disc 7, the enzyme spot being any conventional composition such as that impregated in the enzyme paper described in U.S. Pat. Ser. No. 3,049,-411; inserting a buffer in a plastic film package 9, the buffer being a composition as described in the aforementioned U.S. patent, in recess 10; inserting aluminized paper 12, the manufacture thereof described in the example below, in recess 2; inserting $CuCl_2$ in a plastic film package 13 in recess 14; and inserting, in recess 3, a substrate 15 of composition such as described in U.S. Pat. Ser. No. 3,515,644. A system for detecting mustard agent in air or water can be provided in combination with the above described nerve agent detection system by inserting a plastic film disc 16, made of plastic film, in recess 17 of module 6 and superimposing on disc 16 a mustard agent spot test 18 of composition 4-nitrobenzyl pyridine impregnated in a conventional substrate; inserting package 11, made of plastic film, containing $K_2CO_3$ within recess 19; and superimposing module 6 on section 5 of the container shown at 20 in FIG. 3. The plastic film used in the apparatus has particular utility regarding the mustard agent detection system, because this system is very sensitive to contamination by volatile matter within commercially available plastic film. After assembly of the nerve agent system components and mustard agent system components as described above; container 20 with module 6 superimposed thereon, cover 4 superimposed on container 20 and module 6, and aluminum shield 21 superimposed on cover 4 are laminated together utilizing conventional laminating technique to form the integral chemical system unit shown at 22 in FIG. 5. The operation of the above described exemplary nerve agent and mustard agent detection systems will be described as follows to render the application complete in all respects. To test the environment for nerve agent presence, shield 21 is peeled off by means of serrulated corner 23, as shown in FIG. 5, and the shield discarded; package 9 is ruptured by squeezing to cause the buffer solution content to flow through channel 24 to thoroughly wet disc 8; unit 22 is exposed to the environment containing suspected nerve agent and/or mustard agent for approximately six minutes; package 13 is ruptured and the $CuCl_2$ solution squeezed along channel 25 to contact aluminum paper 12 to generate sufficient heat to achieve adequate sensitivity for the mustard agent spot test, completion of the mustard agent test being subsequently described; unit 22 is folded along line 26 and spot disc 8 held against substrate 15 for approximately two minutes; upon folding unit 22 back to the position shown in FIG. 5, no color on spot disc 8 indicates presence of nerve agent which has inhibited the enzyme action, and, if no agent is present, a blue color results in disc 8 as a result of the substrate-enzyme reaction. To complete the test of the environment for mustard agent presence, after all of the steps described above regarding nerve agent detection have been performed, package 11 is ruptured and the $K_2CO_3$ solution squeezed along channel 27 to wet spot 18; no color change in spot 18 after wetting by $K_2CO_3$ indicates no mustard agent is present, and a change to a purple color, after spot 18 is wetted by $K_2CO_3$, indicates the presence of mustard agent.

The use of aluminized paper in my apparatus overcomes the prior art aluminum disc leakage problem, because $CuCl_2$ is absorbed by the paper and excess $CuCl_2$ is thereby held within the apparatus. By dispersing aluminum particles through paper, a larger surface area is presented to be contacted by and reacted with the $CuCl_2$ solution to produce instant heat and overcome the prior art problem of difficult wetting of the aluminum discs by the $CuCl_2$ solution. Lastly, the aluminized paper is more easily handled than the prior art aluminum discs. A typical procedure for preparing the aluminized paper for my apparatus is described in the following example.

Example

Approximately 3.0 grams of conventional blotting paper, approximately 9.0 grams of 325 mesh aluminum powder, and 2000 ml. of water are mixed at high speed for approximately three minutes in a conventional blender, such as a Waring Blender, to separate the individual fibers. The resulting slurry is emptied into a conventional paper mold, and the water is allowed to drain completely out. The resulting aluminum paper mat is removed from the paper mold screen, placed in an oven and dried at approximately 90° C. for approximately two hours, and cut to sizes suitable for assembly into my apparatus.

The thickness, weight, ratio of paper pulp to aluminum, and paper characteristics are adjustable within the skill of the art to meet the requirements for any given application.

It is obvious that other modifications can be made of my invention, and I desire to be limited only by the scope of the appended claims.

I claim:

1. In an apparatus for detection of environment toxic agent contamination comprising a protective shield means; a plastic film container means having a plurality of recesses formed therein to receive heat generating components, and a plurality of toxic agent chemical detection components; a plastic film cover means located between the shield means and said plastic film container means; a plastic film module means having recesses located between the plastic film cover means and the plastic film container means; a plastic film package means containing a $CuCl_2$ solution disposed in one of said container means recesses; and a plastic film package means containing a chemical component to cooperate in toxic agent detection disposed in one of the recesses of said plastic film module means; a pliable, weldable, and impermeable plastic film of the formula $(CF_2-CPCl)_x$ which is formed by subjecting a plastic film having a low molecular weight volatile content of 50 to 100 parts per million to a vacuum of approximately one millimeter of mercury at 195° F. until the volatile content is reduced to no greater than 0.05 part per million of low molecular weight volatile content when measured at 150° F. under a vacuum of approximately one inch of mercury, said vacuum treated plastic film being used to form the plastic film cover means, the plastic film module means, and the plastic film package means, wherein the improvement in combination therewith is an aluminized paper means disposed in one of the recesses in said plastic film container means and adapted to react exothermally with said $CuCl_2$ solution to generate heat to render sensitivity to a mustard agent spot test.

2. The apparatus of claim 1 wherein the protective shield means, the cover means, the container means, and the module means are laminated together to form an integral unit.

3. The apparatus of claim 1 wherein the toxic agent is an agent selected from the group consisting of nerve agent and mustard agent.

4. The apparatus of claim 1 wherein the chemical component contained within the plastic film package means is $K_2CO_3$.

5. The apparatus of claim 1 wherein the aluminized paper consists of 325 mesh aluminum powder distributed through a paper matrix.

6. The apparatus of claim 5 wherein the ratio of paper to aluminum powder is approximately 3.0 grams to 9.0 grams respectively.

References Cited

UNITED STATES PATENTS

| | | | |
|---|---|---|---|
| 2,785,057 | 3/1957 | Schwab et al. | 23—253 TP |
| 3,018,611 | 1/1962 | Biritz | 23—253 TP |
| 3,036,894 | 5/1962 | Forestiere | 23—230 R |
| 3,476,515 | 11/1969 | Johnson et al. | 23—230 R |

MORRIS O. WOLK, Primary Examiner

R. M. REESE, Assistant Examiner

U.S. Cl. X.R.

206—47 A, 56 A, 56 AA